United States Patent
Iwasaki

(10) Patent No.: US 10,710,416 B2
(45) Date of Patent: Jul. 14, 2020

(54) PNEUMATIC TIRE

(71) Applicant: SUMITOMO RUBBER INDUSTRIES LTD., Kobe-shi (JP)

(72) Inventor: Satoshi Iwasaki, Kobe (JP)

(73) Assignee: SUMITOMO RUBBER INDUSTRIES LTD., Kobe-shi (JP)

( * ) Notice: Subject to any disclaimer, the term of this patent is extended or adjusted under 35 U.S.C. 154(b) by 566 days.

(21) Appl. No.: 14/852,998

(22) Filed: Sep. 14, 2015

(65) Prior Publication Data

US 2016/0089938 A1    Mar. 31, 2016

(30) Foreign Application Priority Data

Sep. 25, 2014    (JP) .................................. 2014-195621

(51) Int. Cl.
*B60C 11/03*    (2006.01)
*B60C 11/12*    (2006.01)

(52) U.S. Cl.
CPC ...... *B60C 11/0327* (2013.01); *B60C 11/0306* (2013.01); *B60C 11/1236* (2013.01); *B60C 2011/0341* (2013.01); *B60C 2011/0365* (2013.01); *B60C 2011/0372* (2013.01); *B60C 2011/1213* (2013.01)

(58) Field of Classification Search
CPC ......... B60C 11/0306; B60C 2011/0365; B60C 2011/0372; B60C 11/1236
See application file for complete search history.

(56) References Cited

U.S. PATENT DOCUMENTS

| | | | |
|---|---|---|---|
| 6,591,880 B1* | 7/2003 | Matsumoto | ......... B60C 11/0309 |
| | | | 152/209.15 |
| 2013/0192731 A1* | 8/2013 | Oji | ...................... B60C 11/0302 |
| | | | 152/209.8 |

FOREIGN PATENT DOCUMENTS

| | | | |
|---|---|---|---|
| DE | 4019631 A | * | 1/1991 |
| EP | 2127905 A2 | * | 12/2009 |
| JP | 58-167207 A | * | 10/1983 |

(Continued)

OTHER PUBLICATIONS

Machine translation for Japan 2003-306012 (Year: 2017).*

(Continued)

*Primary Examiner* — Steven D Maki
(74) *Attorney, Agent, or Firm* — Oblon, McClelland, Maier & Neustadt, L.L.P.

(57) ABSTRACT

A pneumatic tire includes a tread having crown grooves, shoulder grooves, middle lands, and shoulder lands. Each middle land has middle blocks and middle inclined lateral grooves such that the middle inclined lateral grooves are inclining relative to tire axial direction and connecting a crown groove and a shoulder groove, each shoulder land has shoulder blocks and shoulder inclined lateral grooves such that the shoulder inclined lateral grooves are inclining relative to the axial direction and connecting a shoulder groove and a tread edge, and each middle inclined lateral groove is positioned adjacent to a shoulder block such that each middle inclined lateral groove and the shoulder block are sandwiching the shoulder groove and overlapping in tire circumferential direction and have a ratio Lov/Lmg ranging from 0.7 to 1.0, where Lov represents tire circumferential overlapping length Lov, and Lmg represents tire circumferential length Lmg of the middle inclined lateral grooves.

20 Claims, 7 Drawing Sheets

(56) References Cited

FOREIGN PATENT DOCUMENTS

| | | | |
|---|---|---|---|
| JP | 07-323705 A | * | 12/1995 |
| JP | 2003-306012 A | * | 10/2003 |
| JP | 2013-173521 A | | 9/2013 |
| WO | WO 2015/037464 A1 | | 3/2015 |

OTHER PUBLICATIONS

Machine translation for Japan 07-323705 (Year: 2017).*
Machine translation for Japan 58-167207 (Year: 2018).*
Machine translation for German 4019631 (Year: 2019).*

* cited by examiner

PNEUMATIC TIRE

CROSS-REFERENCE TO RELATED APPLICATIONS

The present application is based upon and claims the benefit of priority to Japanese Patent Application No. 2014-195621, filed Sep. 25, 2014, the entire contents of which are incorporated herein by reference.

BACKGROUND OF THE INVENTION

Field of the Invention

The present invention relates to a pneumatic tire capable of achieving both steering stability and noise performance.

Description of Background Art

JP2013-173521A describes a pneumatic tire having the following in the tread section: a pair of crown main grooves provided respectively on both sides of the tire equator to extend continuously in a tire circumferential direction; a pair of shoulder main grooves each provided on the tire axially outer side of a crown main groove and extending continuously in a tire circumferential direction; a crown land section sandwiched by the paired crown main grooves; a pair of middle land sections each sandwiched between a crown main groove and a shoulder main groove; and a pair of shoulder land sections each provided on the tire axially outer side of a shoulder main groove. The entire contents of this publication are incorporated herein by reference.

SUMMARY OF THE INVENTION

According to one aspect of the present invention, a pneumatic tire includes a tread having a pair of crown main grooves formed respectively on both sides of a tire equator such that the crown main grooves are extending continuously in a tire circumferential direction, a pair of shoulder main grooves formed on tire axially outer sides of the crown main grooves such that the shoulder main grooves are extending continuously in the tire circumferential direction, a crown land section formed between the crown main grooves such that the pair of crown main grooves is sandwiching the crown land section, a pair of middle land sections formed between the crown main grooves and the shoulder main grooves such that each of the middle land sections is sandwiched between a respective one of the crown main grooves and a respective one of the shoulder main grooves, and a pair of shoulder land sections formed on tire axially outer sides of the shoulder main grooves. Each of the middle land sections has middle blocks and middle inclined lateral grooves such that the middle inclined lateral grooves are inclining relative to a tire axial direction and connecting the respective one of the crown main grooves and the respective one of the shoulder main grooves, each of the shoulder land sections has shoulder blocks and shoulder inclined lateral grooves such that the shoulder inclined lateral grooves are inclining relative to the tire axial direction and connecting a respective one of the shoulder main grooves and a respective one of tread edges of the tread, and each of the middle inclined lateral grooves is positioned adjacent to a respective one of the shoulder blocks such that each of the middle inclined lateral grooves and the respective one of the shoulder blocks are sandwiching the shoulder main groove and overlapping in the tire circumferential direction and have a ratio Lov/Lmg in a range of from 0.7 to 1.0, where Lov represents a tire circumferential overlapping length Lov, and Lmg represents a tire circumferential length Lmg of the middle inclined lateral grooves.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
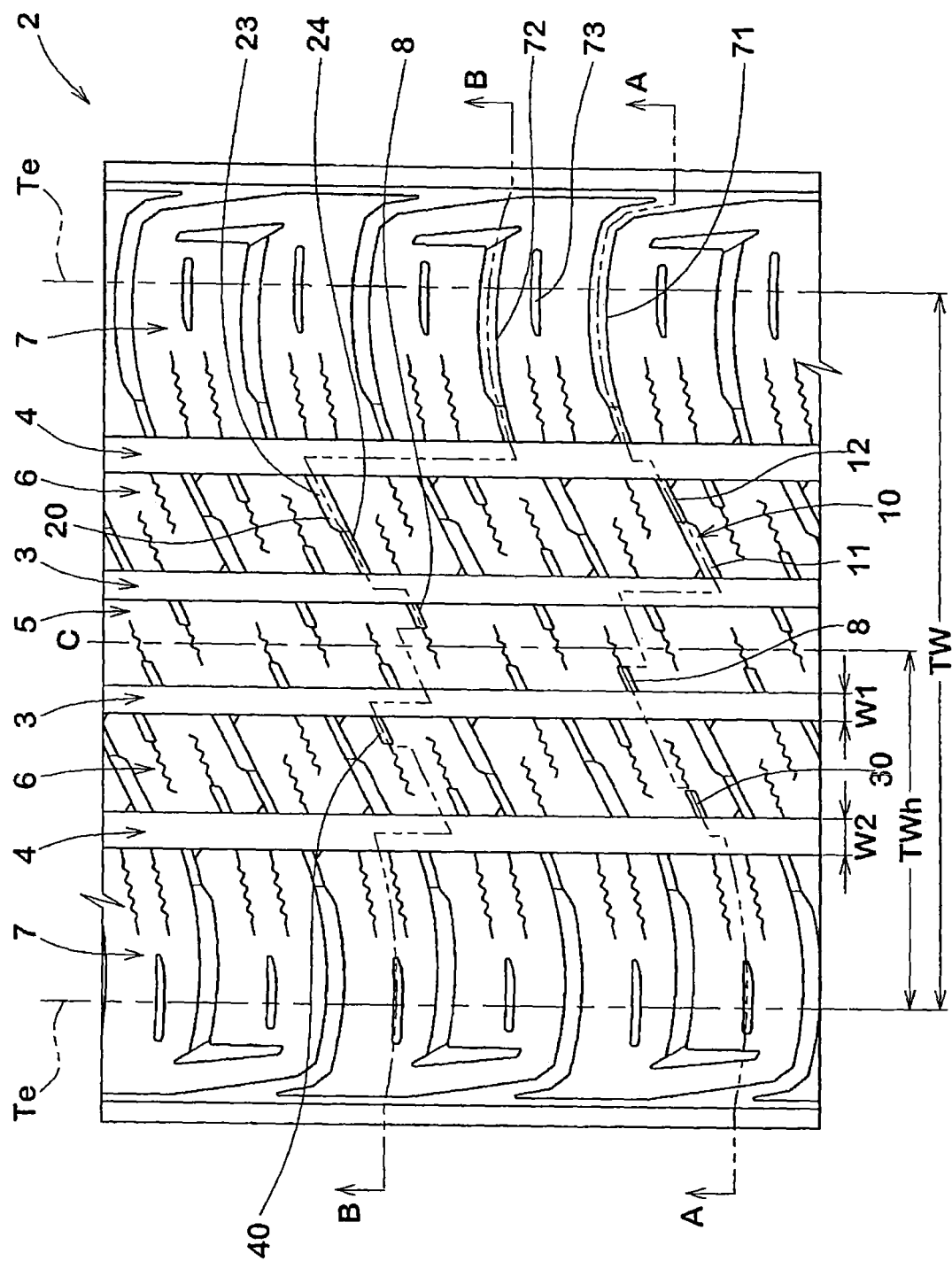
FIG. 1 shows a developing view showing the tread section of a pneumatic tire according to an embodiment of the present invention.

The embodiments will now be described with reference to the accompanying drawings, wherein like reference numerals designate corresponding or identical elements throughout the various drawings.

FIG. 1 is a developing view of tread section 2 of a pneumatic tire according to the present embodiment (the entire view of the tire is omitted). The pneumatic tire of the present embodiment is suitable for mounting on passenger cars, for example. As shown in FIG. 1, the following are formed on tread section 2: a pair of crown main grooves 3 positioned respectively on both sides of tire equator (C) and extending continuously in a tire circumferential direction; and a pair of shoulder main grooves 4 each positioned on the tire axially outer side of a crown main groove 3 and extending continuously in the tire circumferential direction.

Tread section 2 is divided into multiple regions by crown main grooves 3 and shoulder main grooves 4. Namely, tread section 2 is formed with crown land section 5 sandwiched by a pair of crown main grooves (3, 3), a pair of middle land sections 6 each sandwiched between crown main groove 3 and shoulder main groove 4, and a pair of shoulder land sections 7 each positioned on the tire axially outer side of shoulder main groove 4, namely, on the tread edge (Te) side.

A tread edge (Te) indicates the tire axially outermost edge when a tire under normal conditions makes contact with a planar ground at a camber angle of zero degrees when a normal load is applied thereon. Here, normal conditions indicate that a tire is mounted on a normal rim (not shown), is filled with air at a normal inflation pressure and has no load applied thereon. In the following, measurements of portions of a tire are obtained under normal conditions unless otherwise specified.

A "normal rim" indicates a rim specified by a regulatory system that includes standards for the tire: it is specified, for example, as a "Normal Rim" by JATMA, "Design Rim" by TRA, and "Measuring Rim" by ETRTO.

A "normal inflation pressure" indicates air pressure specified by a regulatory system that includes standards for the tire. For example, it is specified as "Maximum Air Pressure" by JATMA, maximum value listed in a table "Tire Load Limits at Various Cold Inflation Pressures" by TRA, and "Inflation Pressure" by ETRTO.

"Normal load" indicates the load specified for each tire by a regulatory system that includes standards for the tire. For example, it is specified as "Maximum Load Capacity" by JATMA, maximum value listed in a table "Tire Load Limits at Various Cold Inflation Pressures" by TRA, and "Load Capacity" by ETRTO. The load applied on a tire used for a passenger car corresponds to 88% of the above load.

Crown main groove 3 continuously extends straight in a tire circumferential direction and discharges water near tire equator (C) when running on a wet surface. The shape of crown main groove 3 is not limited to that shown in FIG. 1; for example, it may be in a zigzag shape or curved in an S-shape.

The same as crown main groove 3, shoulder main groove 4 continuously extends straight in a tire circumferential direction, and it may be in a zigzag shape or curved in an S-shape.

Regarding groove widths (W1, W2) of crown main groove 3 and shoulder main groove 4 respectively (the groove width measured at a right angle to a longitudinal direction of a groove; the same applies to other grooves), they may vary according to conventional settings. However, if groove widths (W1, W2) are set too great, the rigidity in crown land section 5, middle land section 6 and shoulder land section 7 is lowered, and steering stability may not be enhanced. On the other hand, if groove widths (W1, W2) are set too narrow, water and snow discharge capability may decrease. Moreover, under such conditions, snow pillars are not formed large enough to enhance snow performance. Thus, groove width (W1) is preferred to be, for example, 2~6% of contact-patch width (TW), and groove width (W2) is preferred to be, for example, 3~7% of contact-patch width (TW).

Figure 2A:
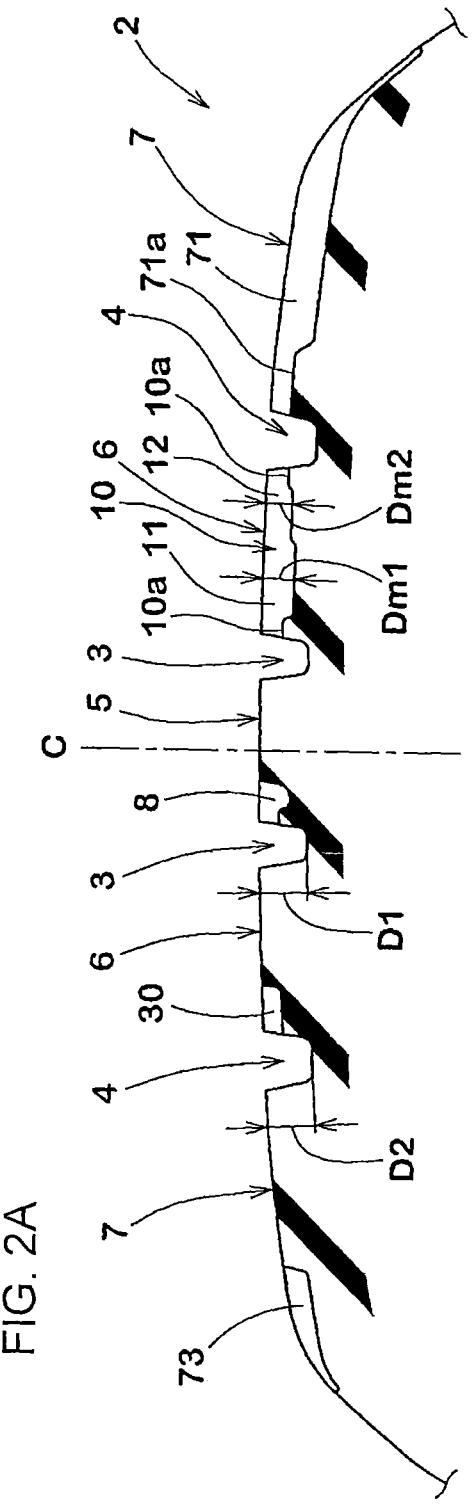
FIGS. 2A and 2B show cross-sectional views of the tread section in FIG. 1.
Figure 2B:
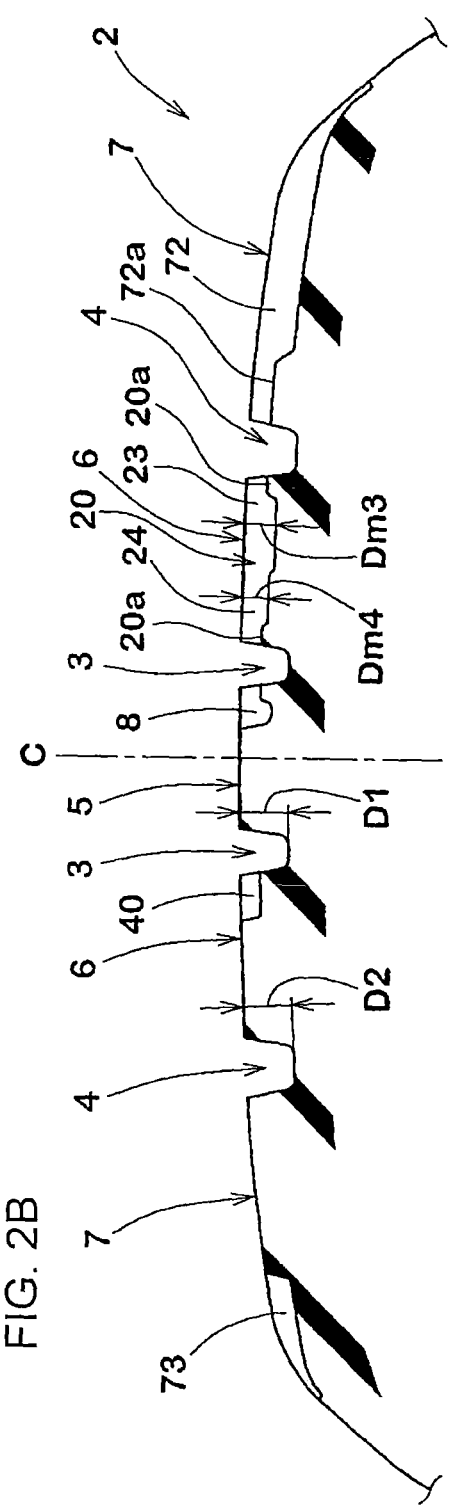

FIG. 2(a) shows the cross-sectional view taken at the A-A line in FIG. 1 and FIG. 2(b) shows the cross-sectional view taken at the B-B line in FIG. 1. Groove depths (D1, D2) of crown main groove 3 and shoulder main groove 4 respectively are set in the same manner as for groove widths (W1, W2). If groove depths (D1, D2) are too great, the rigidity of crown land section 5, middle land section 6 and shoulder land section 7 is lowered, and steering stability may not be enhanced. On the other hand, if groove depths (D1, D2) are too shallow, water and snow discharge capability may decrease. In addition, since snow pillars are not formed large enough to enhance running performance on snow, groove depths (D1, D2) of a passenger car tire according to the present embodiment are preferred to be set at 7.5~10 mm.

Figure 3:
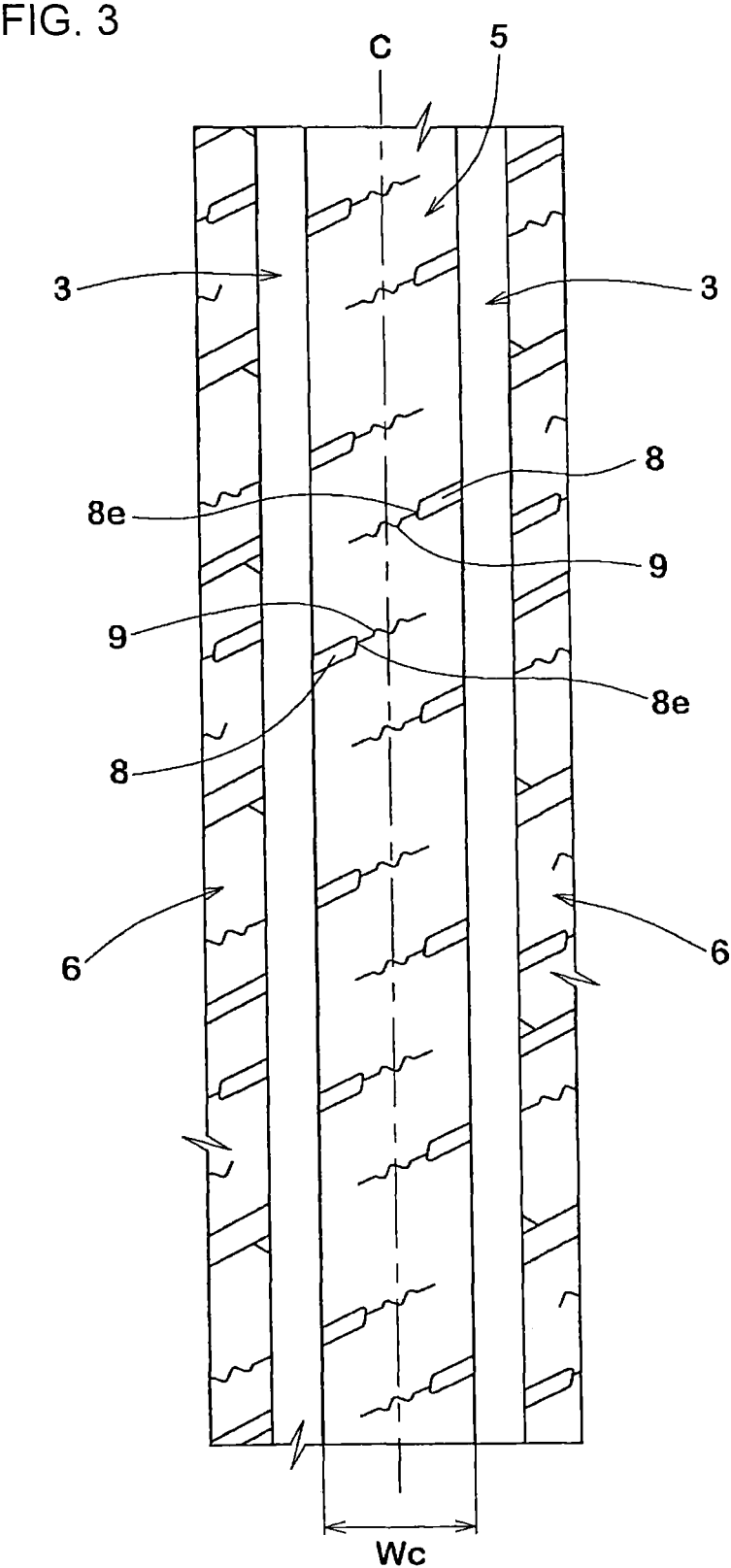
FIG. 3 shows an enlarged developing view of the crown land section in FIG. 1.

FIG. 3 shows an enlarged developing view of crown land section 5. A narrower width (Wc) of crown land section 5 in a tire axial direction may lower dry performance and reduce wear resistance, whereas a greater width may lower wet performance. Thus, width (Wc) is preferred to be at least 20%, more preferably at least 22%, but no greater than 28%, more preferably no greater than 26%, of half tread width (TWh).

Crown slot 8 and crown sipe 9 are provided for crown land section 5. Crown slot 8 extends from crown main groove 3 toward tire equator (C). Crown slot 8 inclines relative to a tire axial direction. Crown slot 8 terminates at edge (8e) positioned just before reaching tire equator (C) in crown land section 5. Such crown slot 8 improves water and snow discharge capability of crown main groove 3, thereby enhancing running performance on a wet road surface and on snow.

Crown sipe 9 extends at an inclination from edge (8e) of crown slot 8 toward tire equator (C), and terminates within crown land section 5 that is beyond tire equator (C). Crown sipe 9 has a wavy or zigzag shape. Excellent edging effects are achieved by such crown sipe 9, thereby increasing the grip on an icy road surface.

In the present embodiment, crown slot 8 and crown sipe 9 do not penetrate through crown land section 5 in a tire axial direction, but terminate within crown land section 5. Accordingly, crown land section 5 is in a rib pattern formed continuously in a tire circumferential direction. Thus, the rigidity of crown land section 5 is well secured, and excellent steering stability and wear resistance are achieved.

Figure 4:
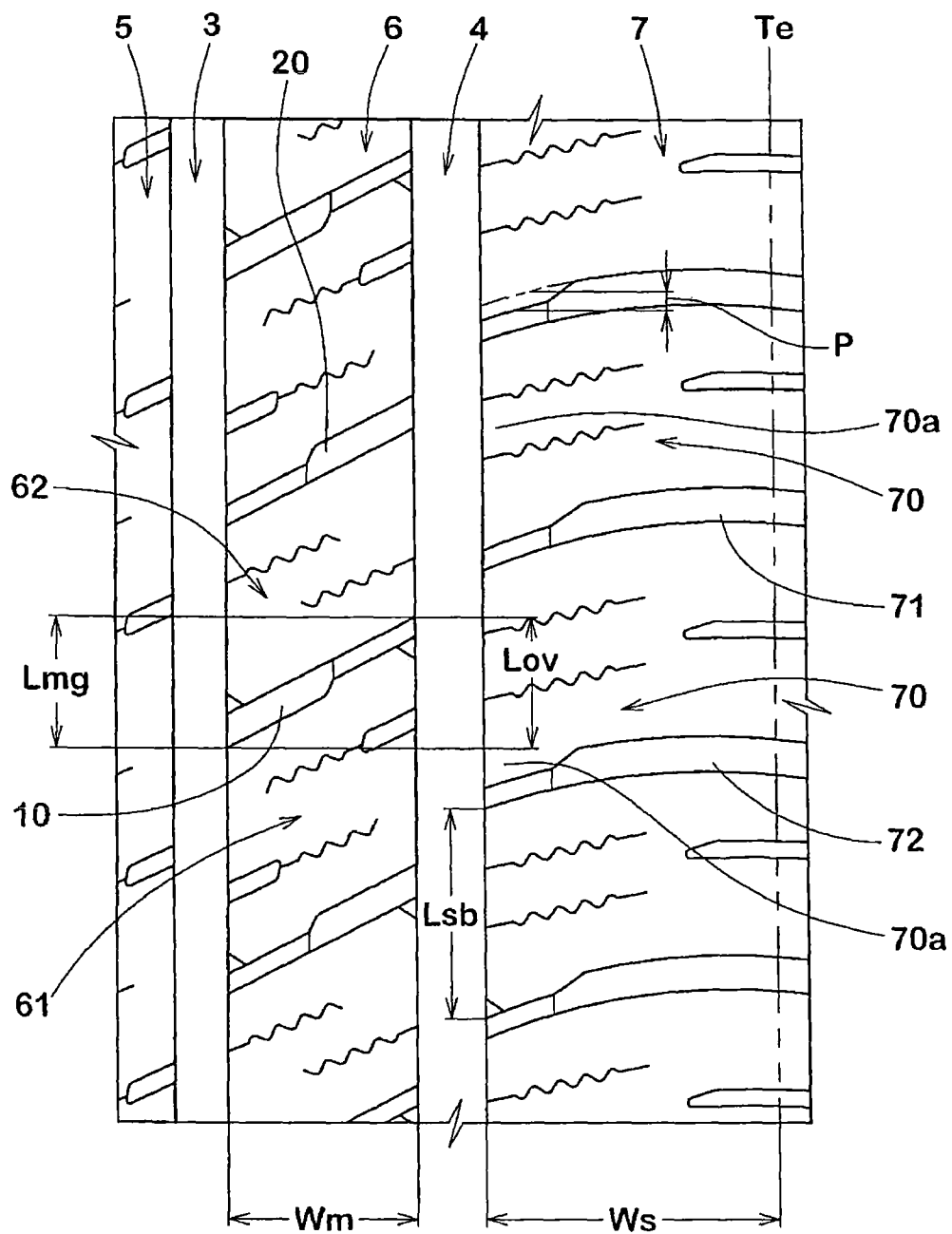
FIG. 4 shows an enlarged developing view of a middle land section and a shoulder land section in FIG. 1.

FIG. 4 shows an enlarged developing view of middle land section 6 and shoulder land section 7.

Width (Wm) of middle land section 6 is preferred to be greater than width (Wc) of crown land section 5 (see FIG. 3). By so setting, contact-patch pressures at crown land section 5 and middle land section 6 are set properly, thereby suppressing uneven wear of the tire. A narrower width (Wm) of middle land section 6 may lower dry performance and reduce wear resistance, whereas a greater width (Wm) may lower wet performance. From those viewpoints, width (Wm) of middle land section 6 is preferred to be at least 24%, more preferably at least 26%, but no greater than 32%, more preferably no greater than 30%, of half tread width (TWh). As a passenger car tire according to the present embodiment, width (Wm) of middle land section 6 is preferred to be 20~30 mm.

Middle land section 6 is provided with first middle inclined lateral grooves 10 and second middle inclined lateral grooves 20, which are set to extend at an inclination relative to a tire axial direction. First and second middle inclined lateral grooves (10, 20) extend in a tire axial direction with the same inclination as that of crown slot 8.

First and second middle inclined lateral grooves (10, 20) are formed to connect crown main groove 3 and shoulder main groove 4. Namely, first and second middle inclined lateral grooves (10, 20) are formed so that crown main groove 3 communicates with shoulder main groove 4. First and second middle inclined lateral grooves (10, 20) are formed alternately in a tire circumferential direction. Middle land section 6 is divided into first middle blocks 61 and second middle blocks 62 by first and second middle inclined lateral grooves (10, 20). The distance between first and second middle inclined lateral grooves (10, 20) is not constant in a tire circumferential direction. First middle block 61 has a greater tire circumferential length than second middle block 62.

As described above, middle inclined lateral grooves (10, 20) extend at an inclination relative to a tire axial direction. Thus, when circumferential edges of middle blocks (61, 62) make contact with the ground, their ground touching timing is off from each other at the leading edge and trailing edge of tread section 2. Accordingly, the noise performance of the pneumatic tire is improved.

Width (Ws) of shoulder land section 7 is preferred to be formed greater than width (Wm) of middle land section 6. By so setting, contact-patch pressures at middle land section 6 and shoulder land section 7 are set properly, thereby suppressing uneven wear of the tire. A narrower width (Ws) of shoulder land section 7 may decrease steering stability and wear resistance, whereas a greater width (Ws) may lower wet performance. Therefore, width (Ws) of shoulder land section 7 is preferred to be at least 44%, more preferably at least 46%, but no greater than 52%, more preferably no greater than 50%, of half tread width (TWh).

Shoulder land section 7 is provided with first shoulder inclined lateral groove 71 and second shoulder inclined lateral groove 72, which extend at an inclination relative to a tire axial direction.

First shoulder inclined lateral groove 71 extends at least from tread edge (Te) in a tire axially inward direction, and communicates with shoulder main groove 4. Second shoulder inclined lateral groove 72 extends at least from tread edge (Te) in a tire axially inward direction, and communicates with shoulder main groove 4.

Shoulder land section 7 is divided into multiple shoulder blocks 70 by first and second shoulder inclined lateral grooves (71, 72). Since shoulder inclined lateral grooves (71, 72) extend at an inclination relative to a tire axial direction, when circumferential edges of shoulder blocks 70 make contact with the ground, their ground touching timing is off from each other at the leading edge and trailing edge of tread section 2. Accordingly, noise performance of the pneumatic tire is enhanced.

Middle inclined lateral grooves (10, 20) and their adjacent shoulder blocks 70 positioned to sandwich shoulder main groove 4 are set to overlap in a tire circumferential direction. Namely, since middle inclined lateral groove (10 or 20) and edge portion (70a) on the shoulder main groove 4 side of shoulder block 70 overlap in a tire circumferential direction, middle inclined lateral groove (10 or 20) and edge portion (70a) of shoulder block 70 touch the ground simultaneously. Therefore, shoulder blocks 70 compensate for a decrease in the rigidity of middle land section 6 caused by the formation of middle inclined lateral grooves (10, 20). Accordingly, a local decrease in the rigidity of tread section 2 is suppressed in a region ranging from middle land section 6 to shoulder land section 7. Accordingly, feel at the steering wheel and responsiveness to steering are enhanced, and steering stability thereby improves.

Moreover, in the present embodiment, middle inclined lateral grooves (10, 20) each have tire circumferential overlapping length (Lov) with shoulder block 70; overlapping length (Lov) and tire circumferential length (Lmg) of middle inclined lateral groove (10 or 20) are set to have a ratio (Lov/Lmg) of 0.7~1.0. Since middle inclined lateral grooves (10, 20) overlap shoulder blocks 70 with a sufficient overlapping length in a tire circumferential direction, the aforementioned effects of supplementing rigidity by shoulder blocks 70 are achieved well and steering stability is further enhanced. Tire circumferential length (Lmg) of middle inclined lateral groove (10 or 20) means the length measured in a tire circumferential direction from one end of middle inclined lateral groove (10 or 20) (the end that first touches the ground in a tire rotational direction) to the end farthest (the end that touches the ground last in the tire rotational direction) from the one end.

In the present embodiment, the entire circumferential length of middle inclined lateral groove 10 overlaps shoulder block 70. Namely, tire circumferential length (Lmg) of middle inclined lateral groove 10 is equal to tire circumferential overlapping length (Lov), and the above ratio (Lov/Lmg) is 1.0. When such a structure is employed, shoulder block 70 exhibits the maximum supplemental effects described above. The same applies to middle inclined lateral groove 20.

First and second shoulder inclined lateral grooves (71, 72) are positioned not to face first and second middle inclined lateral grooves (10, 20) on the other side of shoulder mail groove 4. Namely, first and second shoulder inclined lateral grooves (71, 72) are arranged to have tire circumferential positions shifted from first and second middle inclined lateral grooves (10, 20) respectively. By so setting, along shoulder main groove 4, the edges of first and second shoulder inclined lateral grooves (71, 72) are distributed at different positions from the edges of first and second middle inclined lateral grooves (10, 20). As a result, the rigidity of middle land section 6 and shoulder land section 7 are distributed evenly. Accordingly, locally insufficient rigidity in tread section 2 is suppressed, and steering stability is enhanced.

Figure 5:
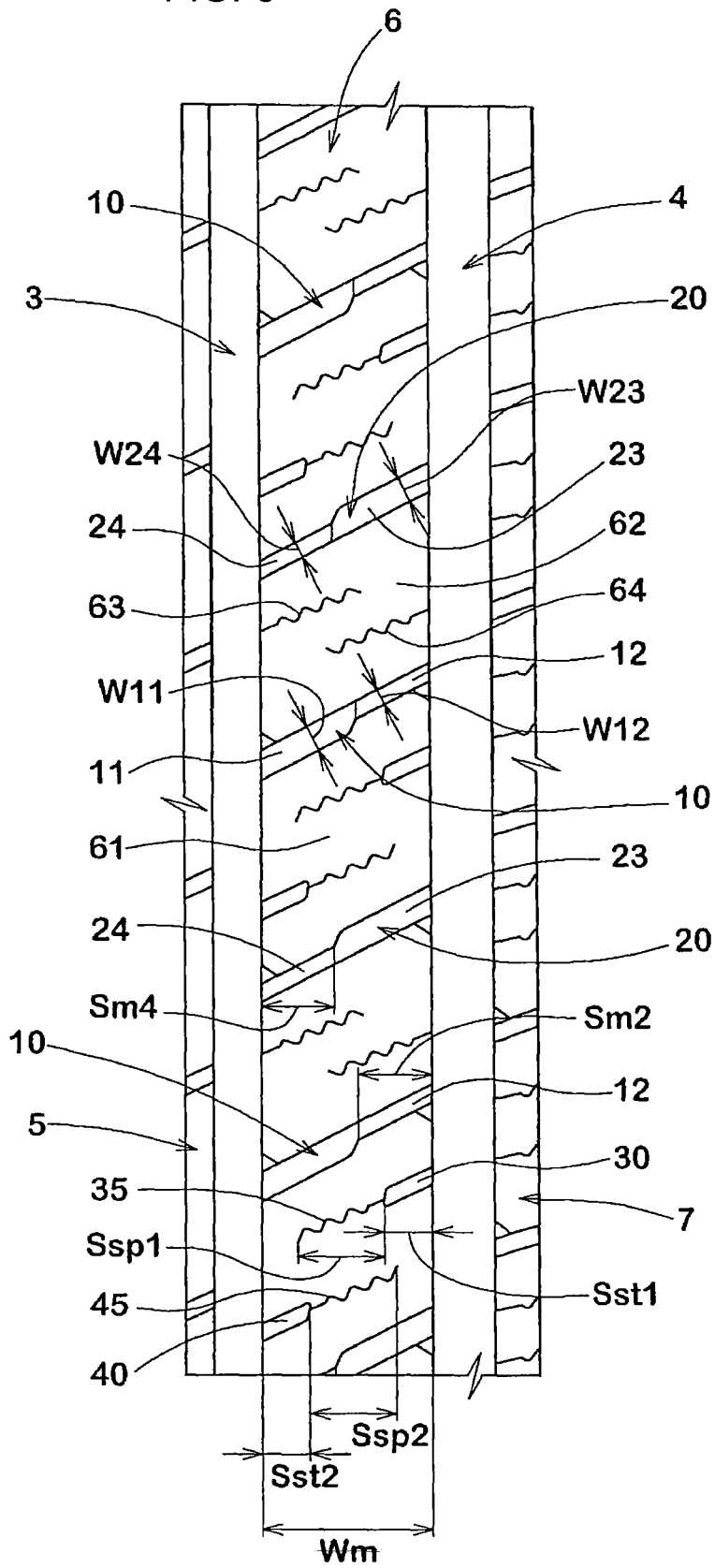
FIG. 5 shows an enlarged developing view of a middle land section in FIG. 1.

FIG. 5 shows an enlarged developing view of middle land section 6. First middle inclined lateral groove 10 has first groove 11 communicating with crown main groove 3 and second groove 12 communicating with shoulder main groove 4. Groove width (W12) of second groove 12 is set smaller than groove width (W11) of first groove 11, that is, the groove space of second groove 12 is narrower than the groove space of first groove 11. First groove 11 and second groove 12 communicate with each other at the tire axially central portion of middle land section 6.

Second middle inclined lateral groove 20 has third groove 23 communicating with shoulder main groove 4 as well as fourth groove 24 communicating with crown main groove 3. Groove width (W23) of third groove 23 is equal to groove width (W11). Groove width (W24) of fourth groove 24 is equal to groove width (W12), but is smaller than groove width (W23) of third groove 23. Namely, the groove space of fourth groove 24 is narrower than the groove space of third groove 23. Third groove 23 and fourth groove 24 communicate with each other at the tire axially central portion of middle land section 6.

Figure 6:
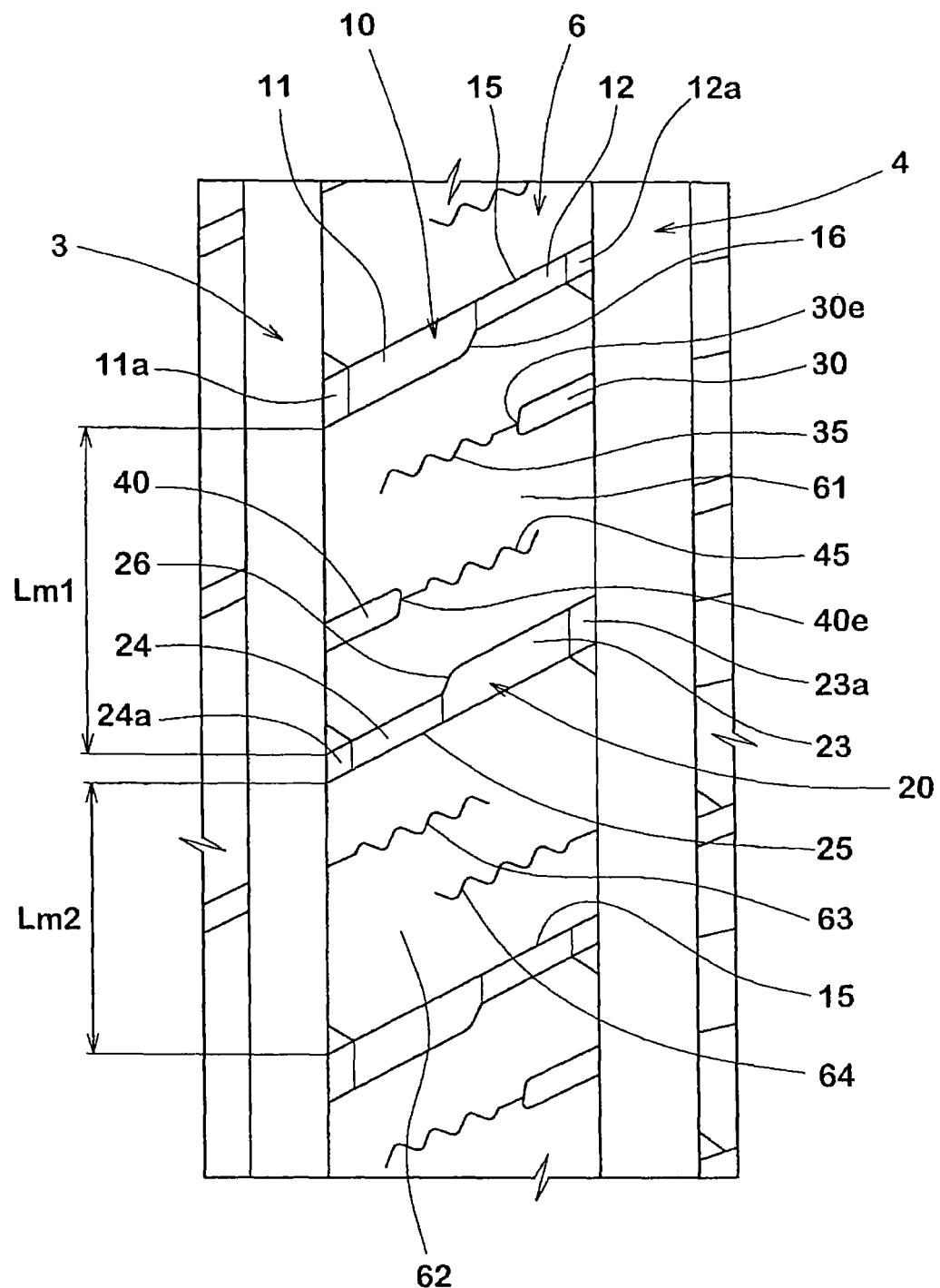
FIG. 6 shows an enlarged developing view of a first middle block and a second middle block in FIG. 5.

FIG. 6 is an enlarged view showing first middle block 61 and its adjacent second middle block 62. Tire circumferential length (Lm1) of first middle block 61 is set greater than tire circumferential length (Lm2) of second middle block 62.

In first middle block 61, first groove 11 of first middle inclined lateral groove 10 and third groove 23 of second middle inclined lateral groove 20 are diagonally positioned in first middle block 61. First groove 11 and third groove 23, which have a greater groove width and are positioned diagonally, contribute to securing groove volumes of middle inclined lateral grooves (10, 20), and enhance snow performance.

On the other hand, second groove 12 of first middle inclined lateral groove 10 and fourth groove 24 of second middle inclined lateral groove 20 are positioned to make another diagonal in first middle block 61. Second groove 12 and fourth groove 24, which have a narrower groove width and have other diagonal positions, contribute to securing the rigidity of middle land section 6 and enhance steering stability.

In the present embodiment, first groove 11 with a greater groove width and fourth groove 24 with a narrower groove width are alternately positioned along crown main groove 3, while second groove 12 with a narrower groove width and third groove 23 with a greater groove width are also alternately positioned along shoulder main groove 4.

When structured as above, since grooves (11, 24) having a greater groove width are not arranged consecutively on either main groove side, the rigidity of middle land section 6 is sufficiently secured, and excellent steering stability and wear resistance are achieved. Furthermore, since grooves (12, 23) having a narrower groove width are not arranged consecutively on either main groove side, excellent water and snow discharge capability of middle land section 6 is achieved, and wet performance and snow performance are enhanced. Moreover, a larger snow pillar and a smaller snow pillar are alternately formed on each main groove side so that a greater shearing force of packed snow is obtained to generate stable driving force on the entire tread surface of middle land section 6.

In addition to the aforementioned first and second middle inclined lateral grooves (10, 20), middle land section 6 is further provided with multiple first middle slots 30 and second middle slots 40. First and second middle slots (30, 40) each extend at the same inclination as that of first and second middle inclined lateral grooves (10, 20) relative to a tire axial direction.

First middle slot 30 is formed near second groove 12, and second middle slot 40 is formed near fourth groove 24. Since second and fourth grooves (12, 24) are positioned diagonally in first middle block 61, first and second middle slots (30, 40) are also positioned diagonally in first middle block 61.

In the present embodiment, since first and second middle slots (30, 40) are formed in first middle block 61 having a greater tire circumferential length, the rigidity distribution in middle land section 6 is uniform, and excellent steering stability and wear resistance are achieved. Moreover, water and snow discharge capability of middle land section 6 is sufficiently secured, thereby enhancing wet performance and snow performance.

First middle slot 30 extends from shoulder main groove 4 toward crown main groove 3, but does not communicate with crown main groove 3. First middle slot 30 has first edge (30e) that terminates within middle land section 6.

Second middle slot 40 extends from crown main groove 3 toward shoulder main groove 4, but does not communicate with shoulder main groove 4. Second middle slot 40 has second edge (40e) that terminates within middle land section 6.

As described above, first and second middle slots (30, 40) are respectively formed near second and fourth grooves (12, 24) with a narrower groove width and terminate within middle land section 6. Thus, uniform rigidity distribution is obtained in middle land section 6, and excellent steering stability and wear resistance are thereby achieved. Moreover, first and second middle slots (30, 40) supplement the water and snow discharge capability of second and fourth grooves (12, 24) so as to further enhance wet performance and snow performance.

In the present embodiment, tire circumferential length (Lm1) of first middle block 61 and tire circumferential length (Lm2) of second middle block 62 are preferred to have a ratio (Lm2/Lm1) of 0.6~0.9.

If the above ratio (Lm2/Lm1) is smaller than 0.6, the rigidity of second middle block 62 is insufficient, and steering stability and wear resistance may not be improved. In addition, such a ratio increases distances among first middle inclined lateral groove 10, second middle inclined lateral groove 20, first middle slot 30 and second middle slot 40, and wet performance and snow performance may not be sufficiently improved. On the other hand, the above ratio (Lm2/Lm1) exceeding 0.9 decreases distances among first middle inclined lateral groove 10, second middle inclined lateral groove 20, first middle slot 30 and second middle slot 40, and the rigidity of first middle block 61 may be insufficient to enhance steering stability and wear resistance.

Middle land section 6 is provided with first middle sipe 35, second middle sipe 45, third middle sipe 63 and fourth middle sipe 64. First and second middle sipes (35, 45) are formed in first middle block 61. Third and fourth middle sipes (63, 64) are formed in second middle block 62.

First middle sipe 35 extends from first edge (30e) of first middle slot 30 toward crown main groove 3, and terminates within middle land section 6 without communicating with crown main groove 3. Second middle sipe 45 extends from second edge (40e) of second middle slot 40 toward shoulder main groove 4 and terminates within middle land section 6 without communicating with shoulder main groove 4. First and second middle sipes (35, 45) have wavy or zigzag shapes.

First and second middle sipes (35, 45) described above contribute to distributing uniform rigidity in first middle block 61 and enhancing steering stability and wear resistance while successfully generating edging effects so as to improve grip on icy road surfaces.

In FIG. 5, tire axial length (Ssp1) of first middle sipe 35 and tire axial length (Wm) of middle land section 6 are preferred to have a ratio (Ssp1/Wm) of 0.38~0.58. Also, tire axial length (Ssp2) of second middle sipe 45 and tire axial length (Wm) of middle land section 6 are preferred to have a ratio (Ssp2/Wm) of 0.38~0.58.

The above ratios (Ssp1/Wm and Ssp2/Wm), each smaller than 0.38, result in insufficient edging effects of first middle sipe 35, and grip on icy road surfaces may not be enhanced sufficiently. On the other hand, the above ratios (Ssp1/Wm and Ssp2/Wm), each exceeding 0.58, cause insufficient rigidity of first middle block 61, and steering stability and wear resistance may not be improved sufficiently.

Third middle sipe 63 extends from crown main groove 3 toward shoulder main groove 4 and terminates within middle land section 6 without communicating with shoulder main groove 4. Fourth middle sipe 64 extends from shoulder main groove 4 toward crown main groove 3, and terminates within middle land section 6 without communicating with crown main groove 3. Third and fourth middle sipes (63, 64) have wavy or zigzag shapes.

Third and fourth middle sipes (63, 64) described above contribute to distributing uniform rigidity in second middle block 62 and enhancing steering stability and wear resistance while successfully generating edging effects so that grip on icy road surfaces is improved.

Moreover, tire axial length (Sst1) of first middle slot 30 in FIG. 5 is preferred to be shorter than tire axial length (Sm2) of second groove 12. Also, tire axial length (Sst2) of second middle slot 40 is preferred to be shorter than tire axial length (Sm4) of fourth groove 24.

More preferably, tire axial length (Sst1) of first middle slot 30 and tire axial length (Sst2) of second middle slot 40 are each 5~10 mm.

If tire axial length (Sst1) of first middle slot 30 and tire axial length (Sst2) of second middle slot 40 are each less than 5 mm, first and second middle slots (30, 40) cannot sufficiently exhibit water and snow discharge capability, and running performance in wet or icy road conditions may not be enhanced well.

If tire axial length (Sst1) of first middle slot 30 and tire axial length (Sst2) of second middle slot 40 each exceed 10 mm, the rigidity of first middle block 61 is insufficient, and steering stability and wear resistance may not be improved sufficiently.

Meanwhile, tire axial length (Sm2) of second groove 12 and tire axial length (Sm4) of fourth groove 24 are each more preferred to be 11~18 mm.

If tire axial length (Sm2) of second groove 12 and tire axial length (Sm4) of fourth groove 24 are each shorter than 11 mm, the water and snow discharge capability of second groove 12 is not exhibited sufficiently. Also, a middle inclined lateral groove and a shoulder block make contact with the ground simultaneously, and wet performance and snow performance may not be enhanced sufficiently.

If tire axial length (Sm2) of second groove 12 and tire axial length (Sm4) of fourth groove 24 each exceed 18 mm, the rigidity of first middle block 61 is insufficient, and steering stability and wear resistance may not be enhanced sufficiently.

In FIG. 2(a), groove depth (Dm1) of first groove 11 is preferred to be greater than groove depth (Dm2) of second groove 12. Also, in FIG. 2(b), groove depth (Dm3) of third groove 23 is preferred to be greater than groove depth (Dm4) of fourth groove 24.

Groove depth (Dm1) of first groove 11 and groove depth (Dm2) of second groove 12 are more preferred to have a ratio (Dm2/Dm1) of 0.5~0.9. Also, groove depth (Dm3) of third groove 23 and groove depth (Dm4) of fourth groove 24 are more preferred to have a ratio (Dm4/Dm3) of 0.5~0.9.

The above ratios (Dm2/Dm1 and Dm4/Dm3) of smaller than 0.5 cause insufficient rigidity of middle land section 6 near first groove 11 and fourth groove 24, and steering stability and wear resistance may not be enhanced sufficiently. Also, such a ratio causes insufficient water and snow discharge capability in second groove 12 and third groove 23, and wet performance and snow performance may not be enhanced sufficiently.

The above ratios (Dm2/Dm1 and Dm4/Dm3) exceeding 0.9 cause insufficient water and snow discharge capability in first groove 11 and fourth groove 24, and wet performance and snow performance may not be enhanced sufficiently. Also, such a ratio causes insufficient rigidity of middle land section 6 near second groove 12 and third groove 23, and steering stability and wear resistance may not be enhanced well.

As shown in FIG. 2(a), the ends of first middle inclined lateral groove 10 along crown main groove 3 and along shoulder main groove 4 are each provided with tie-bar-shaped raised portion (10a), which is elevated from the groove bottom. Because of raised portion (10a), adjacent first middle block 61 and second middle block 62 are connected at both ends of first middle inclined lateral groove 10, and the rigidity of middle land section 6 is thereby enhanced. In the same manner, both ends of second middle inclined lateral groove 20 are each provided with tie-bar-shaped raised portion (20a), which is elevated from the groove bottom as shown in FIG. 2(b). Because of raised portion (20a), adjacent first middle block 61 and second middle block 62 are connected at both ends of second middle inclined lateral groove 20, and the rigidity of middle land section 6 is thereby enhanced. Raised portions (10a) include raised portion (11a) on the crown main groove 3 side and raised portion (12a) on the shoulder main groove 4 side (see FIG. 6). Also, raised portions (20a) include raised portion (2a) on the shoulder main groove 4 side and raised portion (24a) on the crown main groove 3 side.

As shown in FIG. 6, first middle inclined lateral groove 10 is outlined with straight groove border 15 formed in a straight line and step groove border 16 formed in the shape of a step and facing straight groove border 15. First groove 11 with a greater groove width and second groove 12 with a narrower groove width are shaped by straight groove border 15 and step groove border 16.

Second middle inclined lateral groove 20 is outlined with straight groove border 25 formed in a straight line and step groove border 26 formed in the shape of a step and facing straight groove border 25. Third groove 23 with a greater groove width and fourth groove 24 with a narrower groove width are shaped by straight groove border 25 and step groove border 26.

First middle block 61 is positioned to be sandwiched between adjacent step groove borders (16, 26). Thus, first middle slot 30 and first middle sipe 35 are formed near step groove border 16. Also, second middle slot 40 and second middle sipe 45 are formed near step groove border 26.

Second middle block 62 is positioned to be sandwiched between adjacent straight groove borders (15, 25). Thus, third middle sipe 63 is formed near straight groove border 25. Also, fourth middle sipe 64 is formed near straight groove border 15.

Figure 7:
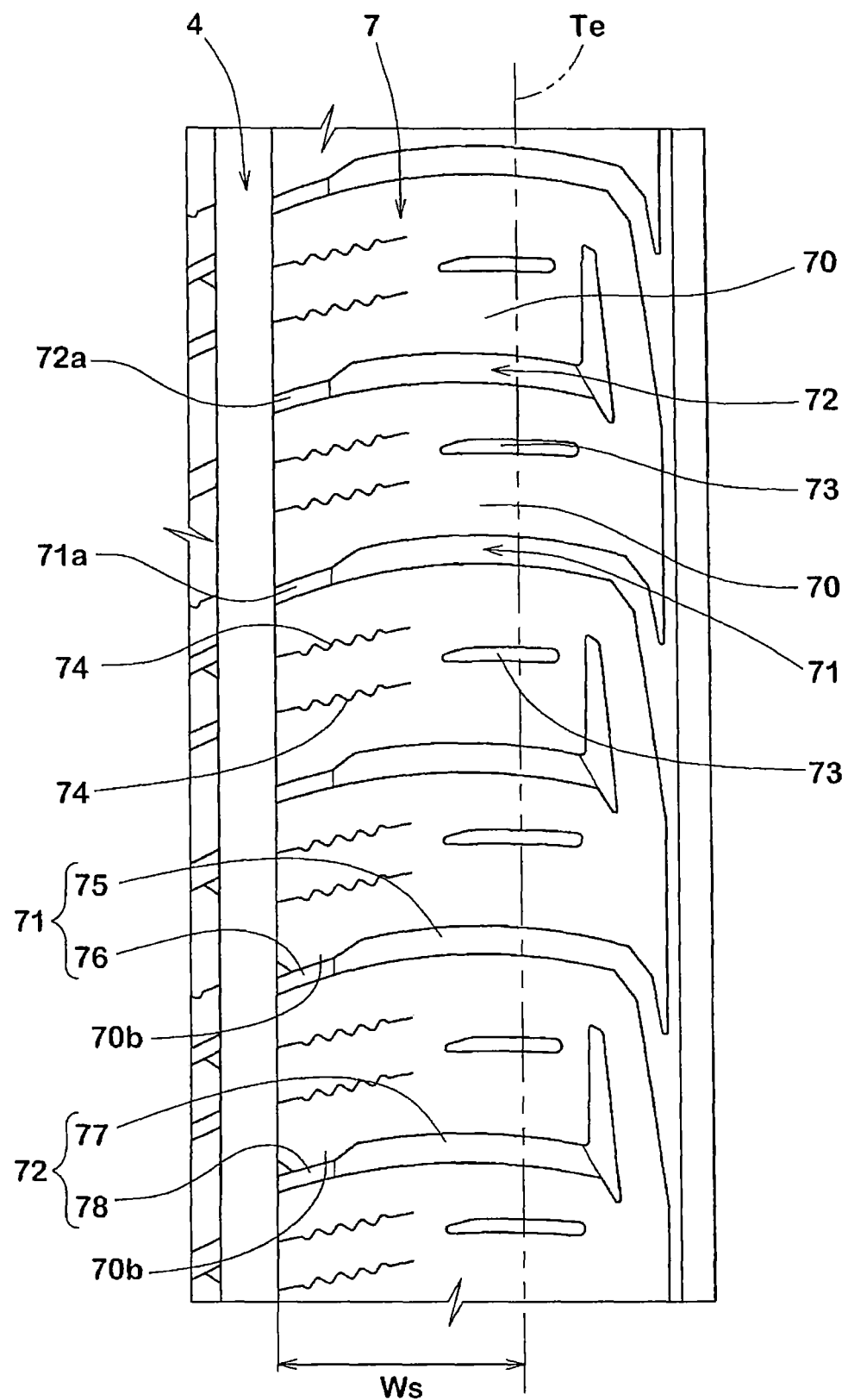
FIG. 7 shows an enlarged developing view of a shoulder land section in FIG. 1.

FIG. 7 shows an enlarged developing view of shoulder land section 7.

Shoulder land section 7 is provided with shoulder lateral groove 73 and shoulder sipe 74 in addition to the aforementioned first shoulder inclined lateral groove 71 and second shoulder inclined lateral groove 72.

Tire axially outer-edge borders of adjacent first shoulder inclined lateral grooves 71 communicate with each other along the tire axially outer-edge border positioned on the tire axially outer side of second shoulder inclined lateral groove 72 and shoulder lateral grooves 73.

First shoulder inclined lateral groove 71 includes fifth groove 75 communicating with tread edge (Te) and sixth groove 76 communicating with shoulder main groove 4. Fifth groove 75 and sixth groove 76 communicate with each other near the edge of shoulder land section 7 along shoulder main groove 4. The groove width of sixth groove 76 is set smaller than the groove width of fifth groove 75. Namely, the groove space of sixth groove 76 is narrower than the groove space of fifth groove 75. By so setting, excellent water and snow discharge capability is achieved near tread edge (Te) while the rigidity of tread section 2 near shoulder main groove 4 is enhanced. In addition, a greater shearing force of packed snow is obtained near tread edge (Te). Also, tire circumferential length (Lmg) of middle inclined lateral groove 20 is set greater while the aforementioned ratio (Lov/Lmg) is kept within a range of 0.7~1.0. Accordingly, middle inclined lateral groove 20 makes a greater inclination angle relative to a tire axial direction, and noise performance is enhanced.

The same as above, second shoulder inclined lateral groove 72 includes fifth groove 77 communicating with tread edge (Te) and sixth groove 78 communicating with shoulder main groove 4. Fifth groove 77 and sixth groove 78 communicate with each other near the edge of shoulder land section 7 along shoulder main groove 4. The groove width of sixth groove 78 is set smaller than the groove width of fifth groove 77. Namely, the groove space of sixth groove 78 is narrower than the groove space of fifth groove 77. By so setting, excellent water and snow discharge capability is achieved near tread edge (Te) while the rigidity of tread section 2 near shoulder main groove 4 is enhanced. In addition, a greater shearing force of packed snow is obtained near tread edge (Te). Also, tire circumferential length (Lmg) of middle inclined lateral groove 10 is set greater while the aforementioned ratio (Lov/Lmg) is kept within a range of 0.7~1.0. Accordingly, middle inclined lateral groove 10 makes a greater inclination angle relative to a tire axial direction, and noise performance is enhanced.

As shown in FIGS. 2(a) and 2(b), the edges of first and second shoulder inclined lateral groove (71, 72) along shoulder main groove 4 are respectively provided with tie-bar-shaped raised portions (71a, 72a), which are elevated from the groove bottom. Because of raised portions (71a, 72a), adjacent shoulder blocks 70 are joined at the raised portions of first and second shoulder inclined lateral grooves (71, 72), and the rigidity of shoulder land section 7 is enhanced. As a result, shoulder blocks 70 work effectively to supplement the rigidity of middle blocks (61, 62), thereby further enhancing steering stability.

Shoulder lateral groove 73 extends at least from tread edge (Te) in a tire axially inward direction and terminates without communicating with shoulder main groove 4.

First shoulder inclined lateral groove 71, second shoulder inclined lateral groove 72 and shoulder lateral groove 73 contribute to improving water and snow discharge capability of shoulder land section 7, and wet performance and snow performance are thereby enhanced. Moreover, traction capability is enhanced when snow pillars formed on the tread surface of shoulder land section 7 are sheared by first shoulder inclined lateral groove 71, second shoulder inclined lateral groove 72 and shoulder lateral groove 73.

Shoulder sipe 74 extends from shoulder main groove 4 in the tire axially outward direction and terminates without communicating with tread edge (Te). A pair of shoulder sipes 74 is provided for each shoulder block. Shoulder sipe 74 is formed on each side of shoulder lateral groove 73 in a circumferential direction, and has a wavy or zigzag shape.

Shoulder sipes 74 structured as above contribute to distributing uniform rigidity in shoulder block 70 so as to enhance steering stability and wear resistance while successfully generating edging effects to increase grip on icy road surfaces.

As shown in FIG. 4, tire circumferential length (Lmg) of middle inclined lateral groove 10 or 20 and tire circumferential length (Lsb) of shoulder block 70 are preferred to have a ratio (Lmg/Lsb) of 0.4~0.8. Here, tire circumferential length (Lsb) of shoulder block 70 means the maximum length of shoulder block 70 measured in a tire circumferential direction.

The above ratio (Lmg/Lsb) of smaller than 0.4 decreases the inclination of middle inclined lateral grooves (10, 20) relative to a tire axial direction, and noise performance may be lowered. In addition, such a ratio decreases the number of first and second shoulder inclined lateral grooves (71, 72), and may lower the water and snow discharge capability of shoulder land section 7. On the other hand, the above ratio (Lmg/Lsb) exceeding 0.8 reduces the rigidity of middle land section 6, thus adversely affecting steering stability. In addition, such a ratio reduces the rigidity of shoulder block 70 in a tire circumferential direction, and shoulder block 70 may not exhibit the aforementioned effects for supplementing rigidity.

As shown in FIG. 7, edge portion (70b) of shoulder block 70 bordered by sixth groove (76 or 78) protrudes in a circumferential direction. When shoulder block 70 is provided with edge (70b) protruding in a circumferential direction, the circumferential rigidity of shoulder block 70 is improved. Protruding length (P) of edge portion (70b) (see FIG. 4) is preferred to be less than 0.5 mm. Such edge portion (70b) improves rigidity and contributes to enhancing steering stability.

In shoulder block 70, protruding length (P) of edge portion (70b) and tire circumferential length (Lsb) of shoulder block 70 are preferred to have a ratio (P/Lsb) of 0.1~0.4.

The above ratio (P/Lsb) of smaller than 0.1 limits the effects of edge portion (70b) on improving the rigidity of shoulder block 70. On the other hand, the above ratio (P/Lsb) exceeding 0.4 may locally reduce the rigidity of edge portion (70b), and steering stability may be adversely affected.

The land ratio determined by all grooves and land sections is preferred to be 64% or greater, more preferably 66% or greater, and is preferred to be 72% or less, more preferably 70% or less. By so setting, well-balanced dry performance and wet performance are achieved. A "land ratio" measured between tread edges (Te, Te) indicates a ratio of the area actually making contact with the ground to the entire area of the virtual contact-patch surface obtained by filling all the grooves.

According to a pneumatic tire of the present embodiment having the aforementioned structure, middle inclined lateral grooves (10, 20) and shoulder inclined lateral grooves (71, 72) are designed to incline relative to a tire axial direction. Accordingly, when circumferential edges of middle blocks (61, 62) and shoulder blocks 70 make contact with the ground, their ground touching timing is off from each other at the leading edge and trailing edge of tread section 2. As a result, noise performance of the pneumatic tire is enhanced.

Middle inclined lateral grooves (10, 20) and their adjacent shoulder blocks 70 positioned to sandwich shoulder main groove 4 are set to overlap in a tire circumferential direction. Accordingly, middle inclined lateral grooves (10, 20) and shoulder blocks 70 simultaneously touch the ground. Thus, a decrease in the rigidity of middle land section 6 caused by the formation of middle inclined lateral grooves (10, 20) is compensated for by shoulder blocks 70, thereby suppressing a local decrease in the rigidity of tread section 2 in the region ranging from middle land section 6 to shoulder land section 7. As a result, steering stability is improved.

Furthermore, tire circumferential overlapping length (Lov) of middle inclined lateral groove (10 or 20) and shoulder block 70 and tire circumferential length (Lmg) of middle inclined lateral groove (10 or 20) are set to have a ratio (Lov/Lmg) of 0.7~1.0. Accordingly, since middle inclined lateral grooves (10, 20) and shoulder blocks 70 overlap with a sufficient circumferential length, shoulder blocks 70 exhibit sufficient effects of supplementing rigidity as described above and steering stability is further enhanced.

A pneumatic tire according to an embodiment of the present invention has been described in detail. However, the present invention is not limited to the above embodiment, and various modifications are possible.

EXAMPLES

Test pneumatic tires with a size 245/50R20 were prepared to have the tread pattern shown in FIG. 1 and specifications listed in Table 1 and 2. The steering stability and noise performance of each tire were tested using test methods below.

Steering Stability

A test tire mounted on a 20×7.5J rim was mounted on all wheels of a passenger car with a displacement of 3700 cc under conditions of an inflation pressure of 250 kPa. The test vehicle was driven by a driver on a dry asphalt test course at a speed of 80 km/h~120 km/h. A sensory evaluation by the driver was conducted on feel at the steering wheel and responsiveness to steering. The results are shown in ratings based on the results of Example 3 as being set as 100. The greater the value is, the more outstanding is the indicated steering stability.

Noise Performance

The above specified vehicle was brought to the above test course and the noise generated by tire patterns was measured at 40 km/h, 60 km/h, 80 km/h and 100 km/h. The results are shown in indices based on the results of Example 3 as being set as 100. The greater the value is, the more outstanding is the indicated noise performance.

TABLE 1

|  | Comp. Example 1 | Example 1 | Example 2 | Example 3 | Example 4 | Example 5 |
|---|---|---|---|---|---|---|
| Lov/Lmg | 0.6 | 0.7 | 0.8 | 1.0 | 1.0 | 1.0 |
| 1st Groove, 2nd Groove | formed | formed | formed | formed | formed | formed |
| 3rd Groove, 4th Groove | not formed | formed | formed | formed | not formed | formed |
| 5th Groove, 6th Groove | formed | formed | formed | formed | formed | formed |
| Lmg/Lsb | 1.7 | 1.4 | 1.2 | 0.6 | 0.6 | 0.3 |
| P/Lsb | 0.1 | 0.1 | 0.1 | 0.1 | 0.1 | 0.1 |
| Steering Stability (rating) | 70 | 85 | 90 | 100 | 100 | 110 |
| Noise Performance (index) | 115 | 115 | 110 | 100 | 100 | 85 |

|  | Example 6 | Example 7 | Example 8 | Example 9 | Example 10 | Example 11 |
|---|---|---|---|---|---|---|
| Lov/Lmg | 1.0 | 1.0 | 1.0 | 1.0 | 1.0 | 1.0 |
| 1st Groove, 2nd Groove | formed | formed | formed | formed | formed | formed |
| 3rd Groove, 4th Groove | formed | formed | formed | formed | formed | formed |
| 5th Groove, 6th Groove | formed | formed | formed | formed | formed | formed |
| Lmg/Lsb | 0.4 | 0.8 | 0.9 | 0.6 | 0.6 | 0.6 |
| P/Lsb | 0.1 | 0.1 | 0.1 | 0.0 | 0.4 | 0.5 |
| Steering Stability (rating) | 110 | 95 | 90 | 95 | 95 | 92 |
| Noise Performance (index) | 90 | 105 | 105 | 100 | 100 | 100 |

As shown in Table 1, pneumatic tires according to Examples are confirmed to have well-balanced and significantly enhanced steering stability and noise performance compared with the tire of the Comparative Example.

In a pneumatic tire, a middle land section may divided into multiple middle blocks by multiple middle inclined lateral grooves (corresponding to inner lateral grooves in JP2013-173521A) that are set to incline at an angle of 10~40 degrees relative to a tire axial direction and to connect a crown main groove and a shoulder main groove. A middle inclined lateral groove formed of a first middle inclined lateral groove, which includes a broad-width portion on the tire axially outer side and a narrow-width portion on the tire axially inner side, and a second middle inclined lateral groove, which includes a narrowed portion having the minimum groove width and a widening portion having a groove width that increases gradually from the narrowed portion.

In the pneumatic tire above, middle inclined lateral grooves formed in a middle land section decrease the rigidity of the nearby tread section, and may cause steering stability to be lowered. Especially, in the pneumatic tire provided with a widening portion formed at both ends of a second middle inclined lateral groove, the rigidity near the end of each widening portion may decrease significantly.

JP2013-173521A does not describe technology to compensate for the lowered rigidity in the tread section near the middle inclined lateral grooves. Accordingly, further improvement may be to enhance steering stability.

A pneumatic tire according to an embodiment of the present invention is capable of achieving a high level of enhancement in steering stability, noise performance and so forth.

A pneumatic tire according to one aspect of the present invention has the following in the tread section: a pair of crown main grooves provided respectively on both sides of the tire equator and extending continuously in a tire circumferential direction; a pair of shoulder main grooves each provided on the tire axially outer side of a crown main groove and extending continuously in a tire circumferential direction; a crown land section sandwiched by the paired crown main grooves; a pair of middle land sections each sandwiched between a crown main groove and a shoulder main groove; and a pair of shoulder land sections each positioned on the tire axially outer side of a shoulder main groove. The middle land sections are divided into multiple middle blocks by multiple middle inclined lateral grooves formed to incline relative to a tire axial direction and to connect the crown main groove and the shoulder main groove; the shoulder land sections are divided into multiple shoulder blocks by multiple shoulder inclined lateral grooves formed to incline relative to a tire axial direction and to connect the shoulder main groove and a tread edge; a middle inclined lateral groove and its adjacent shoulder block positioned to sandwich the shoulder main groove are set to overlap in a tire circumferential direction; and tire circumferential overlapping length (Lov) and tire circumferential length (Lmg) of a middle inclined lateral groove are set to have a ratio (Lov/Lmg) of 0.7~1.0.

In a pneumatic tire according to an embodiment of the present invention, a middle inclined lateral groove includes a first middle inclined lateral groove and a second middle inclined lateral groove arranged alternately in a tire circumferential direction; the first middle inclined lateral groove is preferred to include a first groove communicating with the crown main groove as well as a second groove communicating with the shoulder main groove and having a smaller groove width than that of the first groove; and the second middle inclined lateral groove is preferred to include a third groove communicating with the shoulder main groove as well as a fourth groove communicating with the crown main groove and having a smaller groove width than that of the third groove.

In a pneumatic tire according to an embodiment of the present invention, a shoulder inclined lateral groove is preferred to include a fifth groove connected to the tread edge as well as a sixth groove communicating with the shoulder main groove and having a smaller groove width than that of the fifth groove.

In a pneumatic tire according to an embodiment of the present invention, a shoulder inclined lateral groove is preferred to be positioned not to face a middle inclined lateral groove on the other side of the shoulder main groove.

In a pneumatic tire according to an embodiment of the present invention, tire circumferential length (Lmg) of a middle inclined lateral groove and tire circumferential length (Lsb) of a shoulder block are preferred to have a ratio (Lmg/Lsb) of 0.4~0.8.

In a pneumatic tire according to an embodiment of the present invention, the edge portion of a shoulder block bordered by a sixth groove protrudes in a tire circumferential direction, protruding length (P) is less than 0.5 mm, and protruding length (P) and tire circumferential length (Lsb) of the shoulder block are preferred to have a ratio (P/Lsb) of 0.1~0.4.

The tread section of a pneumatic tire according to an embodiment of the present invention is provided with the following: a pair of crown main grooves, a pair of shoulder main grooves, a crown land section, a pair of middle land sections and a pair of shoulder land sections. The middle land sections are divided into multiple middle blocks by multiple middle inclined lateral grooves, and the shoulder land sections are divided into multiple shoulder blocks by multiple shoulders inclined lateral grooves.

Middle inclined lateral grooves and shoulder inclined lateral grooves are formed to incline relative to a tire axial direction. Thus, when tire circumferential edges of a middle block and a shoulder block make contact with the ground, their ground touching timing is off from each other at the leading edge and the trailing edge of the tread section. The noise performance of the pneumatic tire is thereby enhanced.

A middle inclined lateral groove and its adjacent shoulder block positioned to sandwich the shoulder main groove are set to overlap in a tire circumferential direction. Accordingly, the middle inclined lateral groove and the shoulder block touch the ground simultaneously. The shoulder blocks compensate for the lowered rigidity of the middle land section caused by the formation of middle inclined lateral grooves, thereby suppressing a local decrease in the rigidity of the tread section in a region ranging from the middle land section to the shoulder land section. As a result, steering stability is enhanced.

Furthermore, the tire circumferential overlapping length (Lov) of a middle inclined lateral groove and a shoulder block and the tire circumferential length (Lmg) of the middle inclined lateral groove are set to have a ratio (Lov/Lmg) of 0.7~1.0. By so setting, the middle inclined lateral groove and the shoulder block overlap with a sufficient length in a tire circumferential direction, and the shoulder block exhibits the aforementioned effects of compensating for the lowered rigidity. Accordingly, steering stability is further improved.

Obviously, numerous modifications and variations of the present invention are possible in light of the above teachings. It is therefore to be understood that within the scope of the appended claims, the invention may be practiced otherwise than as specifically described herein.

What is claimed is:

1. A pneumatic tire, comprising:
a tread having a pair of crown main grooves formed respectively on both sides of a tire equator such that the crown main grooves are extending continuously in a tire circumferential direction, a pair of shoulder main grooves formed on tire axially outer sides of the crown main grooves such that the shoulder main grooves are extending continuously in the tire circumferential direction, a crown land section formed between the crown main grooves such that the pair of crown main grooves is sandwiching the crown land section, a pair of middle land sections formed between the crown main grooves and the shoulder main grooves such that each of the middle land sections is sandwiched between a respective one of the crown main grooves and a respective one of the shoulder main grooves, and a pair of shoulder land sections formed on tire axially outer sides of the shoulder main grooves, wherein each of the middle land sections comprises a plurality of middle blocks and a plurality of middle inclined lateral grooves such that the middle inclined lateral grooves are inclining relative to a tire axial direction and connecting the respective one of the crown main grooves and the respective one of the shoulder main grooves, each of the shoulder land sections comprises a plurality of shoulder blocks and a plurality of shoulder inclined lateral grooves such that the shoulder inclined lateral grooves are inclining relative to the tire axial direction and connecting a respective one of the shoulder main grooves and a respective one of tread edges of the tread, each of the middle inclined lateral grooves is positioned adjacent to a respective one of the shoulder blocks such that each of the middle inclined lateral grooves and the respective one of the shoulder blocks are sandwiching the shoulder main groove and overlapping in the tire circumferential direction and have a ratio Lov/Lmg in a range of from 0.7 to 1.0, where Lov represents a tire circumferential overlapping length Lov, and Lmg represents a tire circumferential length Lmg of the middle inclined lateral grooves, the plurality of middle inclined lateral grooves includes a plurality of first middle inclined lateral grooves and a plurality of second middle inclined lateral grooves formed alternately in the tire circumferential direction, each of the first middle inclined lateral grooves has a first groove communicating with the respective one of the crown main grooves and a second groove communicating with the respective one of the shoulder main grooves and having a groove width which is smaller than a groove width of the first groove, each of the second middle inclined lateral grooves has a third groove communicating with the respective one of the shoulder main grooves and a fourth groove communicating with the respective one of the crown main grooves and having a groove width which is smaller than a groove width of the third groove, the plurality of first middle inclined lateral grooves and the plurality of second middle inclined lateral grooves are formed alternately in the tire circumferential direction such that the first and second middle inclined lateral grooves are formed in pairs, that the middle inclined lateral grooves have first step groove borders and first straight groove borders formed in the first middle inclined lateral grooves and second step groove borders and second straight groove borders formed in the second middle inclined lateral grooves, and that the second step groove borders face the first step groove borders in the pairs, and each of the middle land sections comprises a plurality of first middle slots and a plurality of second middle slots formed alternately such that each of the first middle slots is connected to a respective one of the shoulder main grooves and formed adjacent to the second groove of an adjacent one of the first middle inclined lateral grooves and that each of the second middle slots is connected to a respective one of the crown main grooves and formed adjacent to the fourth groove of an adjacent one of the second middle inclined lateral grooves.

2. The pneumatic tire according to claim 1, wherein the groove width of the first groove is equal to the groove width of the third groove, and the groove width of the second groove is equal to the groove width of the fourth groove.

3. The pneumatic tire according to claim 2, wherein each of the shoulder inclined lateral grooves has a fifth groove connected to the respective one of the tread edges and a sixth groove communicating with the respective one of the shoulder main grooves and having a groove width which is smaller than a groove width of the fifth groove.

4. The pneumatic tire according to claim 2, wherein each of the shoulder inclined lateral grooves is positioned such that each of the shoulder inclined lateral grooves does not face a respective one of the middle inclined lateral grooves on the other side of the respective one of the shoulder main grooves.

5. The pneumatic tire according to claim 2, wherein the middle inclined lateral grooves and the shoulder blocks have a ratio Lmg/Lsb in a range of from 0.4 to 0.8, where Lsb represents a tire circumferential length of the shoulder blocks.

6. The pneumatic tire according to claim 5, wherein each of the shoulder inclined lateral grooves is positioned such that each of the shoulder inclined lateral grooves does not face a respective one of the middle inclined lateral grooves on the other side of the respective one of the shoulder main grooves.

7. The pneumatic tire according to claim 1, wherein each of the shoulder inclined lateral grooves has a fifth groove connected to the respective one of the tread edges and a sixth groove communicating with the respective one of the shoulder main grooves and having a groove width which is smaller than a groove width of the fifth groove.

8. The pneumatic tire according to claim 7, wherein each of the shoulder inclined lateral grooves is positioned such that each of the shoulder inclined lateral grooves does not face a respective one of the middle inclined lateral grooves on the other side of the respective one of the shoulder main grooves.

9. The pneumatic tire according to claim 8, wherein the groove width of the first groove is equal to the groove width of the third groove, and the groove width of the second groove is equal to the groove width of the fourth groove.

10. The pneumatic tire according to claim 9, wherein the middle inclined lateral grooves and the shoulder blocks have a ratio Lmg/Lsb in a range of from 0.4 to 0.8, where Lsb represents a tire circumferential length of the shoulder blocks.

11. The pneumatic tire according to claim 7, wherein the middle inclined lateral grooves and the shoulder blocks have a ratio Lmg/Lsb in a range of from 0.4 to 0.8, where Lsb represents a tire circumferential length of the shoulder blocks.

12. The pneumatic tire according to claim 11, wherein each of the shoulder inclined lateral grooves is positioned such that each of the shoulder inclined lateral grooves does not face a respective one of the middle inclined lateral grooves on the other side of the respective one of the shoulder main grooves.

13. The pneumatic tire according to claim 1, wherein each of the shoulder inclined lateral grooves is positioned such that each of the shoulder inclined lateral grooves does not face a respective one of the middle inclined lateral grooves on the other side of the respective one of the shoulder main grooves.

14. The pneumatic tire according to claim 13, wherein the middle inclined lateral grooves and the shoulder blocks have a ratio Lmg/Lsb in a range of from 0.4 to 0.8, where Lsb represents a tire circumferential length of the shoulder blocks.

15. The pneumatic tire according to claim 1, wherein the middle inclined lateral grooves and the shoulder blocks have a ratio Lmg/Lsb in a range of from 0.4 to 0.8, where Lsb represents a tire circumferential length of the shoulder blocks.

16. The pneumatic tire according to claim 1, wherein each of the middle land sections comprises a plurality of first middle Sipes connected to the first middle slots respectively, and a plurality of second middle sipes connected to the second middle slots respectively.

17. The pneumatic tire according to claim 16, wherein the plurality of first middle sipes and the plurality of second middle sipes are formed such that the plurality of first middle sipes terminates within in a respective one of the middle land sections without communicating with the crown main grooves and that the plurality of second middle sipes terminates in a respective one of the middle land sections without communicating with the shoulder main grooves.

18. The pneumatic tire according to claim 17, wherein each of the shoulder inclined lateral grooves has a fifth groove connected to the respective one of the tread edges and a sixth groove communicating with the respective one of the shoulder main grooves and having a groove width Which is smaller than a groove width of the fifth groove.

19. The pneumatic tire according to claim 16, wherein each of the shoulder inclined lateral grooves has a fifth groove connected to the respective one of the tread edges and a sixth groove communicating with the respective one of the shoulder main grooves and having a groove width which is smaller than a groove width of the fifth groove.

20. The pneumatic tire according to claim 19, wherein each of the shoulder inclined lateral grooves is positioned such that each of the shoulder inclined lateral grooves does not face a respective one of the middle inclined lateral grooves on the other side of the respective one of the shoulder main grooves.

* * * * *